6 Sheets--Sheet 1.
CHARLES F. PIKE.
Improvement in Signals for Railway Crossings.
No. 124,974. Patented March 26, 1872.
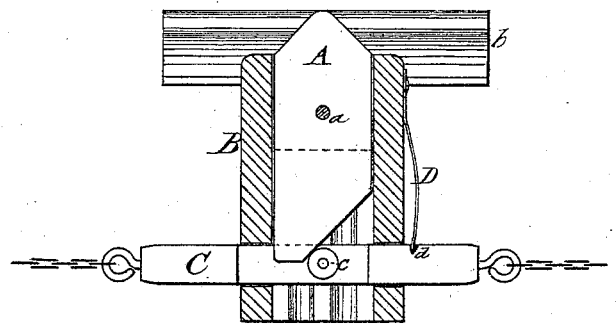
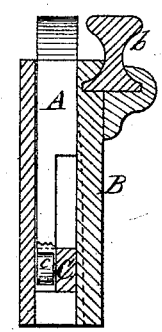
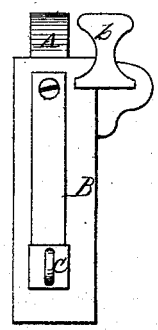
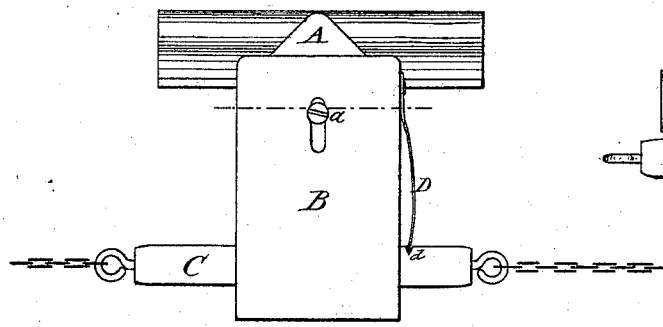
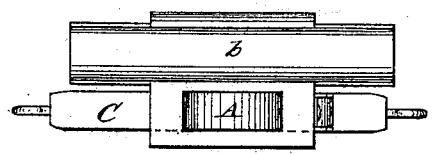
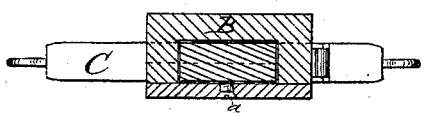
Witnesses:
Inventor:
Charles F. Pike
AM. PHOTO-LITHOGRAPHIC CO. N.Y. (OSBORNE'S PROCESS.)

6 Sheets—Sheet 2.

CHARLES F. PIKE.
Improvement in Signals for Railway Crossings.

No. 124,974.        Patented March 26, 1872.

Witnesses:

Inventor:
Charles F. Pike

6 Sheets--Sheet 3.

CHARLES F. PIKE.
Improvement in Signals for Railway Crossings.

No. 124,974. Patented March 26, 1872.

Witnesses:
J. C. Brecht
E. H. Paem

Inventor:
Charles F. Pike

6 Sheets--Sheet 4.
CHARLES F. PIKE.
Improvement in Signals for Railway Crossings.
No. 124,974. Patented March 26, 1872.
Fig. 14.
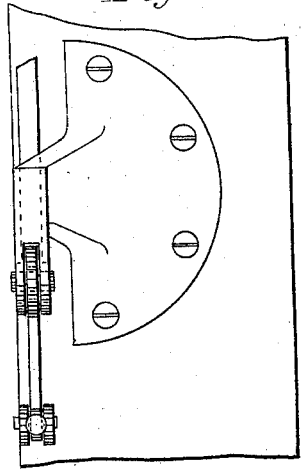
Fig. 15.
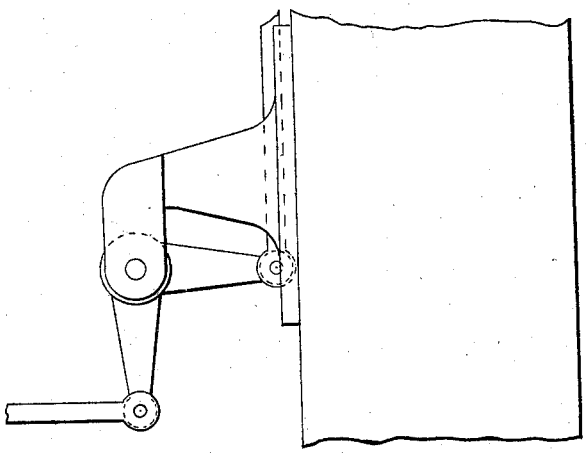
Fig. 16.
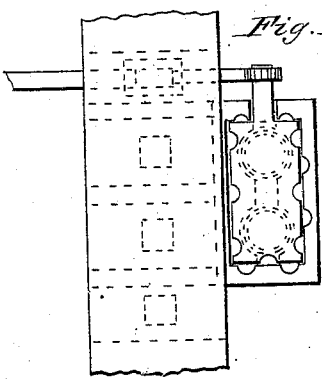
Fig. 17.
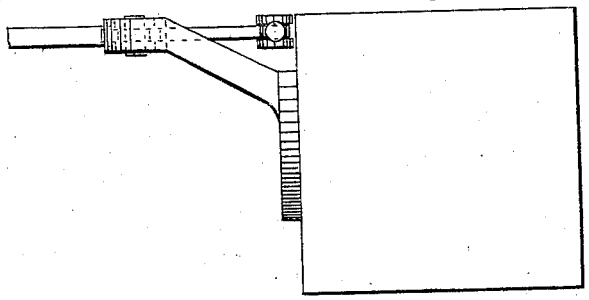
Fig. 18.
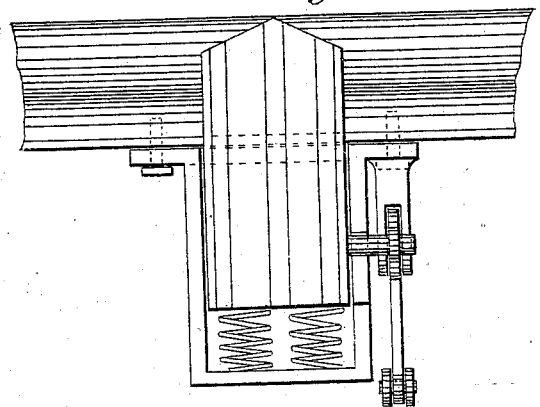
Fig. 18ª.
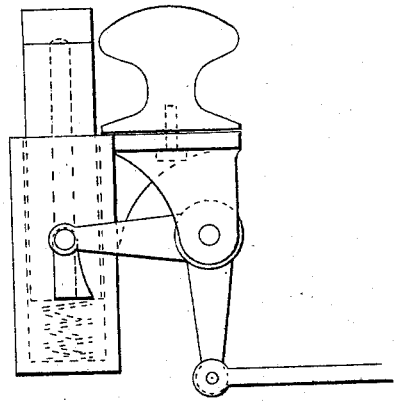
Witnesses:
T. C. Brecht,
E. H. Bacon
Inventor:
Charles F. Pike 6 Sheets--Sheet 5.

CHARLES F. PIKE.
Improvement in Signals for Railway Crossings.
No. 124,974. Patented March 26, 1872.

Witnesses:
T. C. Brecht
E. H. Bacon

Inventor:
Charles F. Pike

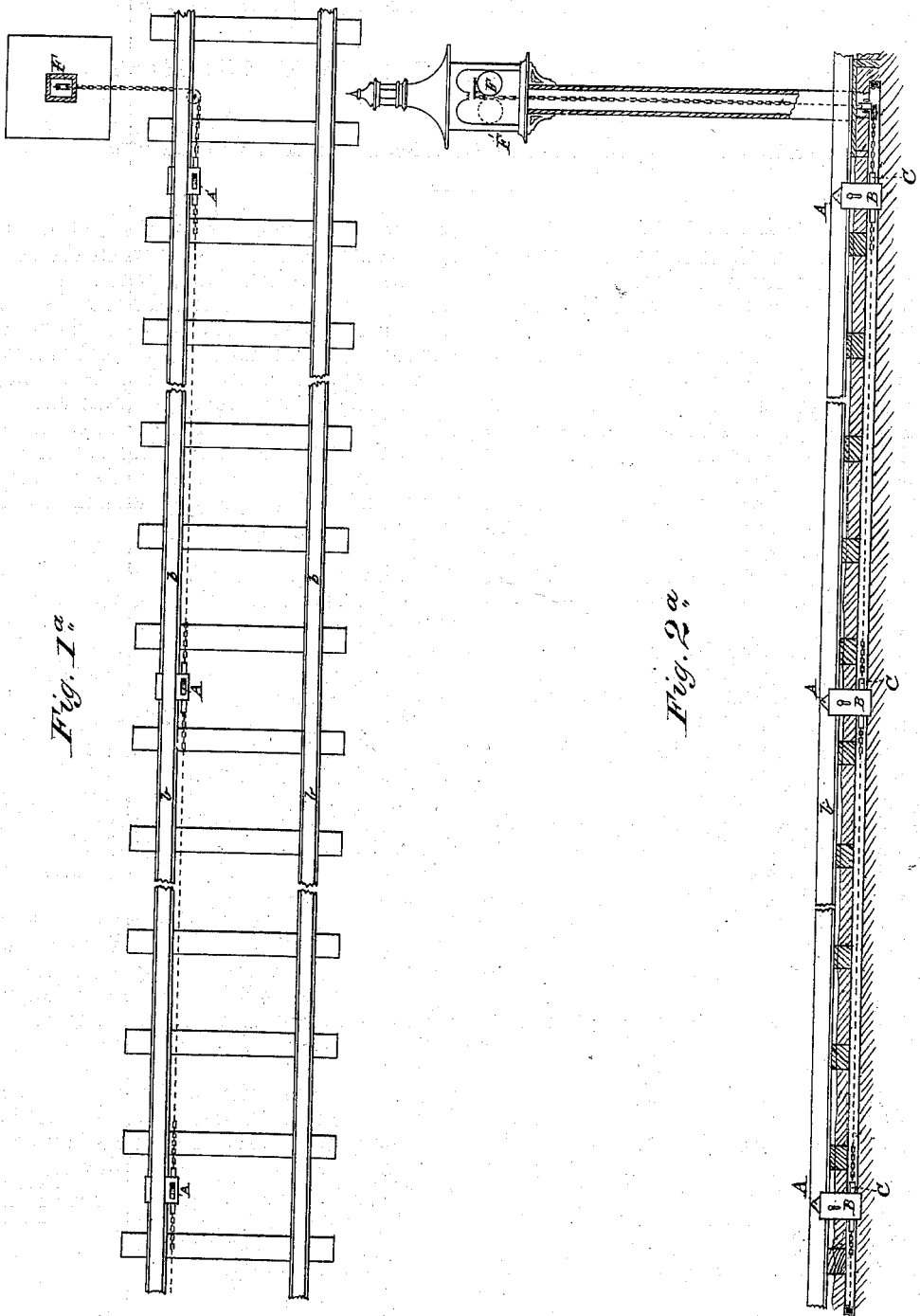

UNITED STATES PATENT OFFICE.

CHARLES F. PIKE, OF PROVIDENCE, RHODE ISLAND.

IMPROVEMENT IN SIGNALS FOR RAILWAY CROSSINGS.

Specification forming part of Letters Patent No. 124,974, dated March 26, 1872.

SPECIFICATION.

Be it known that I, CHARLES F. PIKE, of the city and county of Providence, in the State of Rhode Island, have invented a certain Improvement in "Railway Signals;" and it consists in the arrangement of a number of keys, (twenty, more or less, to the mile,) which are either inserted or arranged alongside of the rails, and one mile each side of the crossings. Said keys are depressed by the wheels of the cars passing over them, and are connected, by chains, wire rope, or pneumatic pipes, to a hammer, for the purpose of striking against a bell or gong and thereby automatically and continuously ringing an alarm, giving persons notice of the approach of railroad trains.

Figure 7:
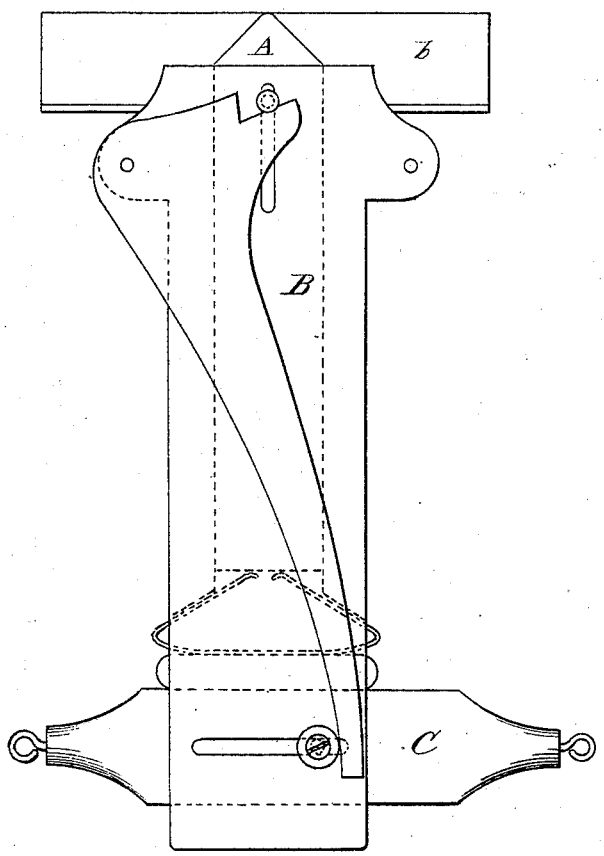
Figure 8:
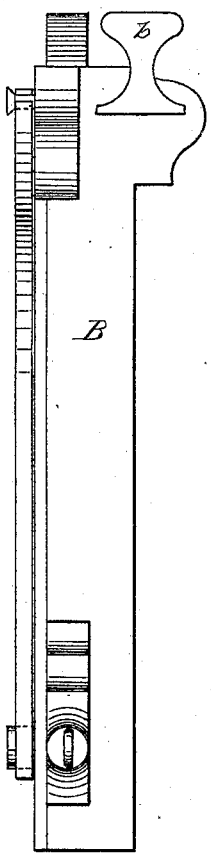
Figure 9:
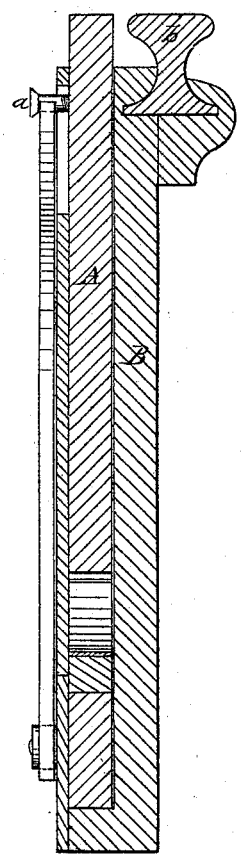
Figure 10:
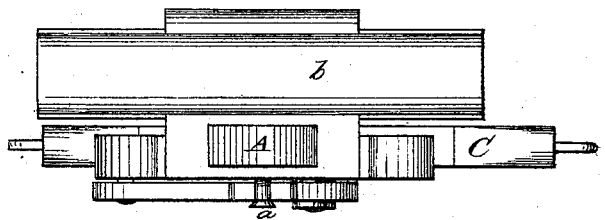
Figure 11:
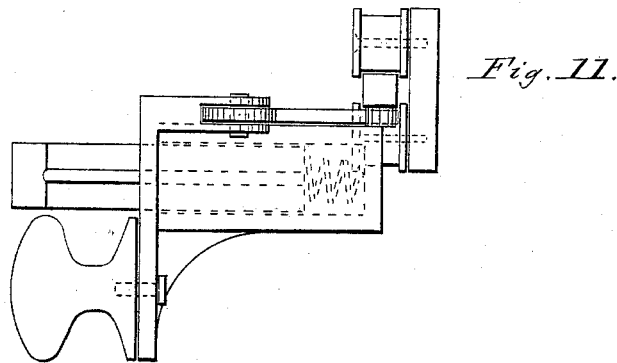
Figure 12:
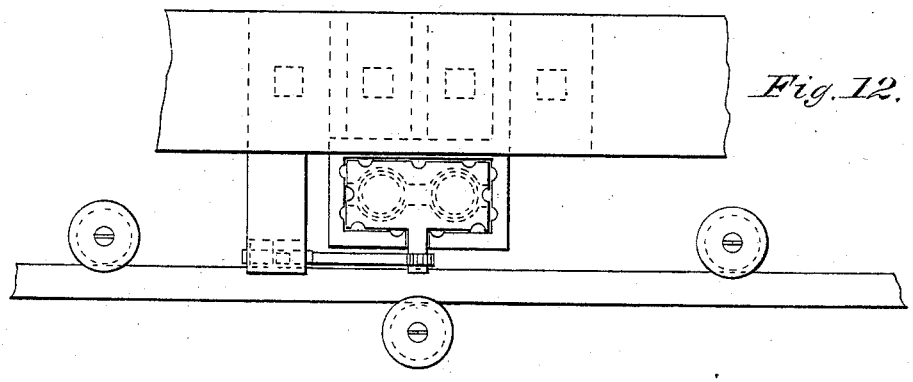
Figure 13:
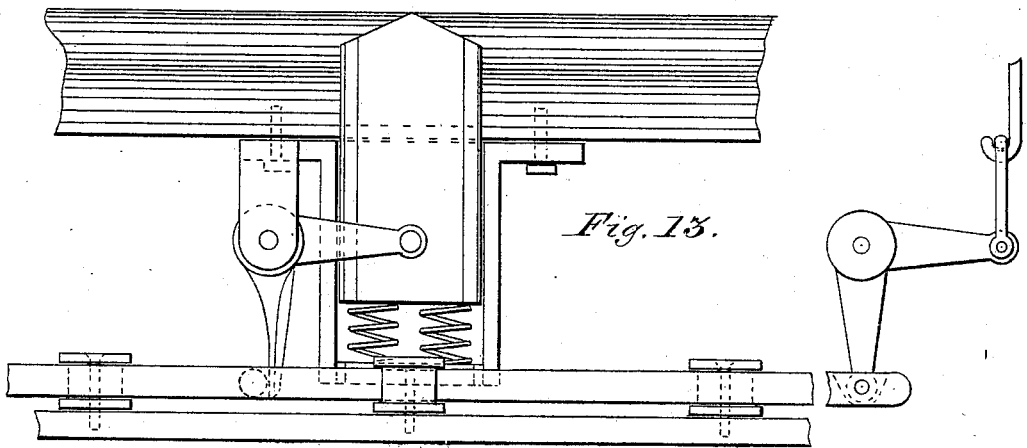
Figure 19:
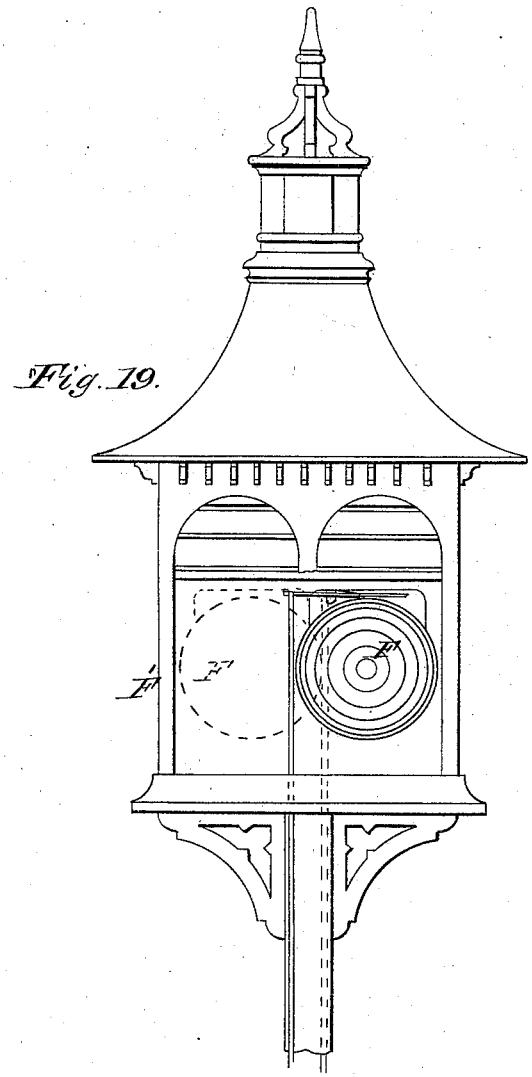
Figure 20:
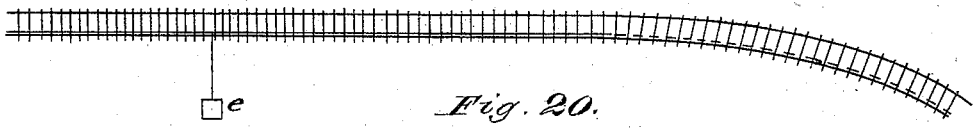

In the accompanying drawing, Figure 1ª is a plan of my invention in position. Fig. 2ª is a side elevation of the same. Figs. 1 and 2 are vertical sectional views of the key. Fig. 3 is an end, Fig. 4 a side, and Fig. 5 a top view of the same; Fig. 6, a section on line $x\ x$. Figs. 7 to 18ª, inclusive, are views of modifications of the same. Fig. 19 represents the bell or alarm tower. Fig. 20 is a plan of the tracks, with the tower.

In the accompanying drawing, A is the key, having its upper end held by a pin, $a$, which moves up and down in a slot in the case or box B as it is depressed by the wheels passing over said key. The lower end of the key A is cut obliquely, and this part slides against a friction-roller, $c$, pivoted to the sliding bar C, to each end of which the chains, wire ropes, or pneumatic tubes are attached. A close box or case, B, is secured onto the lower part of the track $b$, and placed into the earth under the track to be entirely out of the way, excepting its upper end, through which the key passes. The lower end of said case B is open to allow water, &c., that may get in, to leak out. A spring, D, fastened to the side of the case fits into a notch, $d$, in the sliding bar E, by which it is drawn back when the key has been released. The chains, wire rope, or tubes are incased in a small box laid under the ground alongside of the track to keep them unobstructed. Said chains, rope, or tubes may run over pulleys, as shown in Fig. 1ª, or may be connected by suitable bell-cranks and levers to a hammer, which strikes against a bell or gong, F, in the tower F', that is placed near the crossings. When the trains approach a bridge, a signal, $e$, may be arranged a little sidewise of the track.

The operation is as follows: When a train or trains approach a crossing, the wheels depress the keys, and, being connected, they are all forced down, and thereby ring the bell or gong. The keys are depressed, one after the other, until the entire train has passed the crossing, and are forced back to their original position by springs, weights, and levers; and as the wheels depress the keys a continuous ringing of the bell or gong is kept up.

I wish it to be understood that I do not confine myself to the particular devices herein described and shown; but

What I claim, and desire to secure by Letters Patent, is—

1. The combination of a series of keys inserted or arranged alongside of the rails, and connected by chains, wire ropes, or pneumatic tubes to operate a bell or gong or other device to automatically and continuously sound an alarm when a train of cars passes over said keys, as set forth.

2. The combination of the keys A with the box or case B, friction-roller $c$, sliding bar C, and chains, wire rope, or pneumatic tubes, and a gong or bell, or equivalent device, all substantially as and for the purpose set forth.

CHARLES F. PIKE.

Witnesses:
T. C. BRECHT,
E. H. BACON.